(12) United States Patent
Miyamoto et al.

(10) Patent No.: US 9,120,520 B2
(45) Date of Patent: Sep. 1, 2015

(54) SIDE COVER STRUCTURE FOR STRADDLE TYPE VEHICLE

(71) Applicant: HONDA MOTOR CO., LTD., Tokyo (JP)

(72) Inventors: Shiro Miyamoto, Wako (JP); Kanya Takigawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 13/969,164

(22) Filed: Aug. 16, 2013

(65) Prior Publication Data
US 2014/0084623 A1    Mar. 27, 2014

(30) Foreign Application Priority Data

Sep. 21, 2012 (JP) .................................. 2012-208673

(51) Int. Cl.
*B62J 17/00* (2006.01)
*B62J 25/00* (2006.01)

(52) U.S. Cl.
CPC . *B62J 17/00* (2013.01); *B62J 25/00* (2013.01)

(58) Field of Classification Search
CPC ........................................................ B60J 17/00
USPC ........................................................ 296/78.1
See application file for complete search history.

(56) References Cited

U.S. PATENT DOCUMENTS

| 4,776,422 | A  | * | 10/1988 | Sakuma ........................ 180/219 |
| 8,317,212 | B2 | * | 11/2012 | Kobayashi et al. ........ 280/152.1 |
| 8,500,169 | B2 | * | 8/2013  | Aoki .............................. 280/835 |
| 2005/0279557 | A1 | * | 12/2005 | Konno et al. ................. 180/219 |
| 2007/0085366 | A1 | * | 4/2007  | Gray et al. ................. 296/65.01 |
| 2008/0093147 | A1 | * | 4/2008  | Tanaka .......................... 180/219 |
| 2010/0243358 | A1 | * | 9/2010  | Suzuki ........................... 180/219 |
| 2012/0211295 | A1 | * | 8/2012  | Nagai et al. ................... 180/219 |

FOREIGN PATENT DOCUMENTS

JP    2012-61925 A    3/2012

* cited by examiner

*Primary Examiner* — Tony Winner
(74) *Attorney, Agent, or Firm* — Birch, Stewart, Kolasch & Birch, LLP

(57) ABSTRACT

A side cover structure for straddle type vehicle for preventing heat at a part of the vehicle such as a knee grip portion, where the passenger's legs touch. An engine is supported on the vehicle body frame with a passenger seat disposed above the engine. A side cover covers the side direction of the vehicle body. The side cover has a knee grip portion at the position where the passenger's legs touch in the front direction of a passenger seat. In addition, the knee grip portion is doubly configured inside and outside.

13 Claims, 6 Drawing Sheets

SIDE COVER STRUCTURE FOR STRADDLE TYPE VEHICLE

CROSS-REFERENCE TO RELATED APPLICATIONS

The present application claims priority under 35 USC 119 to Japanese Patent Application No. 2012-208673 filed Sep. 21, 2012 the entire contents of which are hereby incorporated by reference.

BACKGROUND OF THE INVENTION

1. Field of the Invention

The present invention relates to a side cover structure for straddle type vehicle.

2. Description of Background Art

Structures are known that provide another part that extends from the front end of a front cowl in the forward direction. See, for example, Japanese Laid-Open Patent Publication No. 2012-61925.

However, in the case of a side cover disposed in the side direction or on the rear direction of an engine, the cover is heated. Accordingly, it is necessary to prevent heat at the part such as a knee grip portion, where the passenger's legs touch.

SUMMARY AND OBJECTS OF THE INVENTION

The present invention has been achieved in consideration of the above-described problems and aims to provide a side cover structure for a straddle type vehicle that can prevent the heat at the part such as a knee grip portion, where the passenger's legs touch.

According to an embodiment of the present invention, a side cover structure for straddle type vehicle includes a vehicle body frame, an engine supported on the vehicle body frame, a passenger seat disposed above the engine, and a side cover covering the side direction of the vehicle body. The side cover has a knee grip portion at the position where the passenger's legs touch in the front direction of the seat. In addition, the knee grip portion is doubly configured inside and outside.

According to an embodiment of the present invention, the side cover has a sub-side cover at least on the knee grip portion, and the sub-side cover is configured so as to spread from above to below in the side direction of the vehicle body.

According to an embodiment of the present invention, a handle is supported on the vehicle body frame for steering a front wheel. The side cover has a main side cover covering the side direction of the vehicle body from below the handle to the rear direction of the seat in the side view. In addition, the sub-side cover covers the main side cover at the knee grip portion with the main side cover having a concaved portion fixing the sub-side cover.

According to an embodiment of the present invention, a front portion, a lower portion, and a rear portion of the sub-side cover are surrounded by a front height difference, a lower height difference, and a rear height difference, which configure the concaved portion of the main side cover, and engage each other, respectively.

According to an embodiment of the present invention, the depth of the concaved portion is formed so as to be approximately the same as at least the thickness of the sub-side cover. In addition, the outer surface of the sub-side cover and the outer surface of the main side cover are configured so as to be in an approximately flush level.

According to an embodiment of the present invention, a fuel tank is disposed in the front direction of the seat with the sub-side cover being continuously provided with the fuel tank below the fuel tank in the side view.

According to an embodiment of the present invention, the sub-side cover is made of a painted ABS resin with the main side cover being made of a colored PP resin.

According to an embodiment of the present invention, an air cleaner is disposed on an intake passage of the engine with the main side cover having a side swelling portion spreading to the side direction of the vehicle body in the rear direction of the sub-side cover. A notching portion is provided on the lower surface side which is adjacent to the side swelling portion with an intake port of the air cleaner being disposed inside the side swelling portion of the main side cover.

According to an embodiment of the present invention, the knee grip portion of the side cover is doubly configured inside and outside. Accordingly, this prevents the damage caused by the heat of the engine on passenger's legs that may touch on the knee grip portion.

According to an embodiment of the present invention, the sub-side cover at the knee grip portion is configured so as to spread from above to below in the side direction of the vehicle body. Accordingly, the sub-side cover at the knee grip portion can guide the passenger's legs to the outside. Simultaneously, this can prevent damage caused by the heat of the engine on passenger's legs holding the vehicle body by using the knees during operation.

According to an embodiment of the present invention, the main side cover has the concaved portion fixing the sub-side cover, despite the large size thereof. Accordingly, the main side cover can increase in strength and prevent the deflection.

According to an embodiment of the present invention, the front portion, the lower portion and the rear portion of the sub-side cover are engaged with the front height difference, the lower height difference, and the rear height difference of the main side cover respectively. Accordingly, the sub-side cover can be integrally engaged with the main side cover. As a result, this can prevent causing the vibration and abnormal noise of the sub-side cover.

According to an embodiment of the present invention, the outer surface of the sub-side cover and the outer surface of the main side cover are configured in an approximately flush level. Accordingly, the outer surface of the sub-side cover and the outer surface of the main side cover can be configured in a continuous surface. As a result, this can prevent the passenger's legs from touching unnaturally to the sub-side cover, which enables the passenger to excellently grip the vehicle body at the knees.

According to an embodiment of the present invention, the fuel tank and the sub-side cover are continuously provided in the side view. Accordingly, this can prevent the passenger's legs from touching unnaturally to the sub-side cover, which enables the passenger to excellently grip the vehicle body at the knees.

According to an embodiment of the present invention, the main side cover in a large size is made of an inexpensive PP resin. On the other hand, the sub-side cover in a small size is made of a painted ABS resin. Accordingly, the entire cost of the side cover can be controlled, and simultaneously the external appearance can be improved by the sub-side cover of a small size.

According to an embodiment of the present invention, if the sub-side cover is continuously provided with the fuel tank which is ordinarily painted, a sense of unity between the fuel tank and the sub-side cover can be emphasized, and the external appearance can be further improved.

According to an embodiment of the present invention, a notching portion is provided on the lower surface side of the side swelling portion inside where the intake port of the air cleaner is disposed. Accordingly, the air can excellently flow from the intake port through the notching portion. Thus, the hot air filled inside the main side cover can be discharged through the notching portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
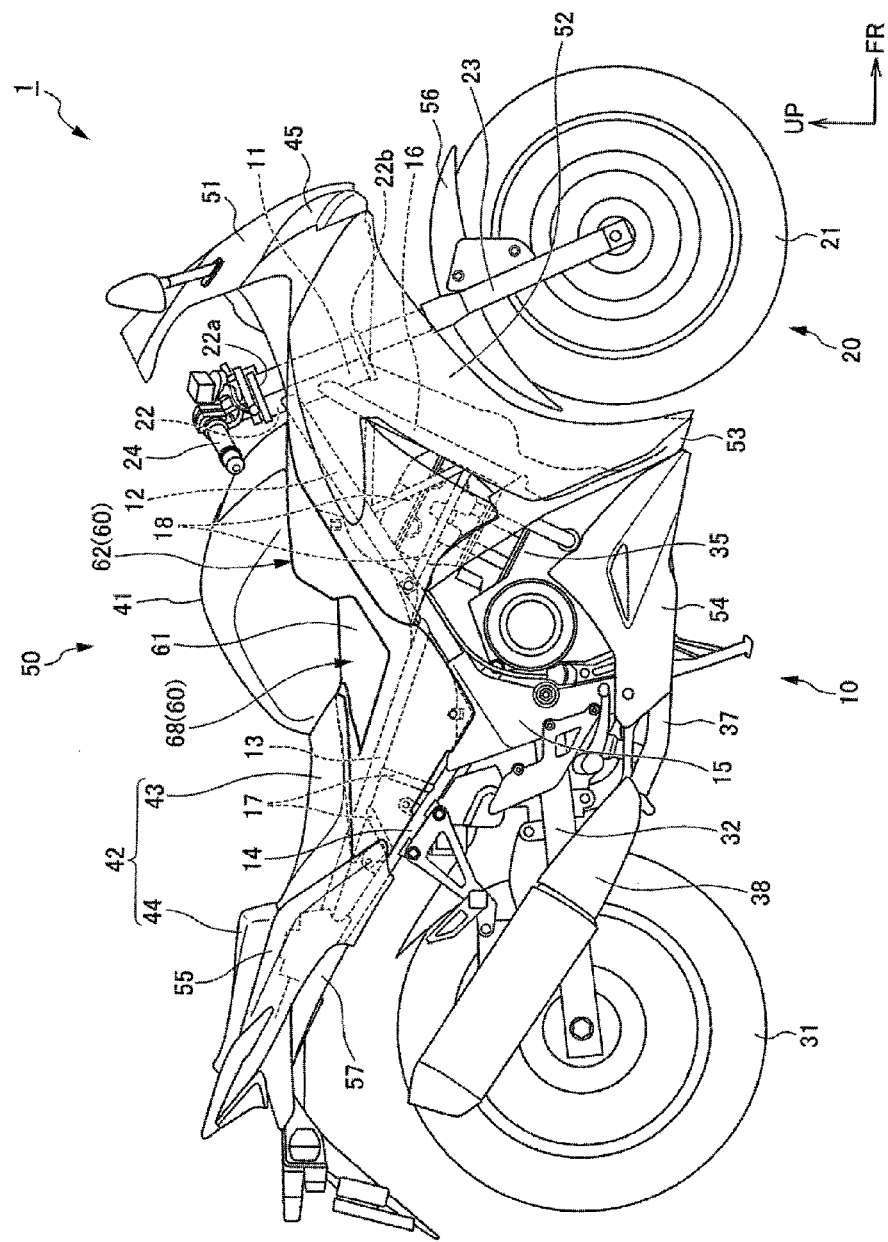
FIG. 1 is a right side view showing a motorcycle as straddle type vehicle having the side cover structure related to the one embodiment of the present invention.

Hereinafter, the embodiment of the present invention will be explained with reference to the drawings.

At first, the total configuration of a motorcycle 1 will be explained as a straddle type vehicle having the side cover structure related to the one embodiment of the present invention, with reference to FIG. 1.

In the explanation set forth below, each direction such as "front-rear," "right-left," and "upper-lower" follows the directions viewed from the passenger (rider) riding on the motorcycle 1 unless otherwise stated. Moreover, in the drawings, an arrow FR shows the front direction of the vehicle, an arrow LH shows the left direction of the vehicle, an arrow RH shows the right direction of the vehicle, and an arrow UP shows the upper direction of the vehicle.

As shown in FIG. 1, the motorcycle 1 in the present embodiment is mainly configured with a vehicle body frame 10, a steering unit 20 configured so as to include a front wheel 21 steerably supported on the vehicle body frame 10, a rear wheel 31, a swing arm 32, an engine 35, an air cleaner 36, an exhaust pipe 37, a muffler 38, a fuel tank 41, a passenger seat 42, a headlight 45, and a vehicle body cover 50 covering the vehicle body.

The vehicle body frame 10 has a head pipe 11, main frames 12, seat rails 13, rear stays 14, pivot plates 15, down tubes 16, and a plurality of cross members 17, 18.

The head pipe 11 is disposed on the front end portion of the vehicle body frame 10. The pair of right and left main frames 12 is provided. The pair of main frames 12 is fixed at the front end portion thereof on the head pipe 11, and is extended obliquely downwardly from the head pipe 11 to the rear direction.

The pair of right and left seat rails 13 is provided. The pair of seat rails 13 is fixed on the pair of main frames 12 at the slightly forward position of the front end portion of the seat rail relative to the rear end portion of the main frame and extends obliquely upwardly from the fixed position to the rear direction.

A pair of right and left rear stays 14 is provided. The pair of rear stays 14 is fixed on the pair of main frames 12 at the rear end portion of the main frame in the front end portion of the rear stay and extends obliquely upwardly from the fixed position to the rear direction. The rear end portion of the rear stay 14 is connected to the rear end portion of the seat rail 13.

The seat rail 13 and the rear stay 14 positioned below the seat rail are vertically connected each other with a plurality of cross members 17.

The pivot plate 15 is fixed on the connecting portion between the rear end portion of the main frame 12 and the front end portion of the seat rail 13 at the upper portion of the pivot plate. A swing arm 32 is vertically and swingably installed through a rear shock absorber (not shown) on the pivot plate 15. The swing arm 32 axially supports the rear wheel 31 on the rear end portion thereof.

A pair of right and left down tubes 16 is provided. The pair of down tubes 16 is fixed on the head pipe 11 at the front end portion of the down tube and extends obliquely rearwardly from the head pipe 11 to the lower direction.

The main frame 12 and the down tube 16 positioned below the main frame are vertically connected to each other with a plurality of cross members 18.

The engine 35 is fixed on the lower portion of the down tube 16.

As necessary, the pair of right and left main frames 12, the pair of right and left seat rails 13, the pair of right and left rear stays 14, and the pair of right and left down tubes 16 are connected to each other with cross members (not shown) extending to the right and left, respectively.

The steering unit 20 has the front wheel 21, a steering stem 22, a front fork 23, and a handle 24.

The steering stem 22 is rotatably supported to right and left relative to the head pipe 11.

A pair of right and left front forks 23 is provided. The pair of front forks 23 is supported on a top bridge 22*a* fixed on the upper end portion of the steering stem 22 and a bottom bridge 22*b* fixed on the lower end portion of the steering stem. The front fork 23 axially supports the front wheel 21 on the lower end portion thereof.

The handle 24 is connected to the upper end portion of the steering stem 22 and extends to the right and left.

The engine 35 has a cylinder axis slightly inclined from the vertical in the front direction. The engine is fixed on the vehicle body frame 10 in the area surrounded by the main frame 12 and the down tube 16.

Figure 2:
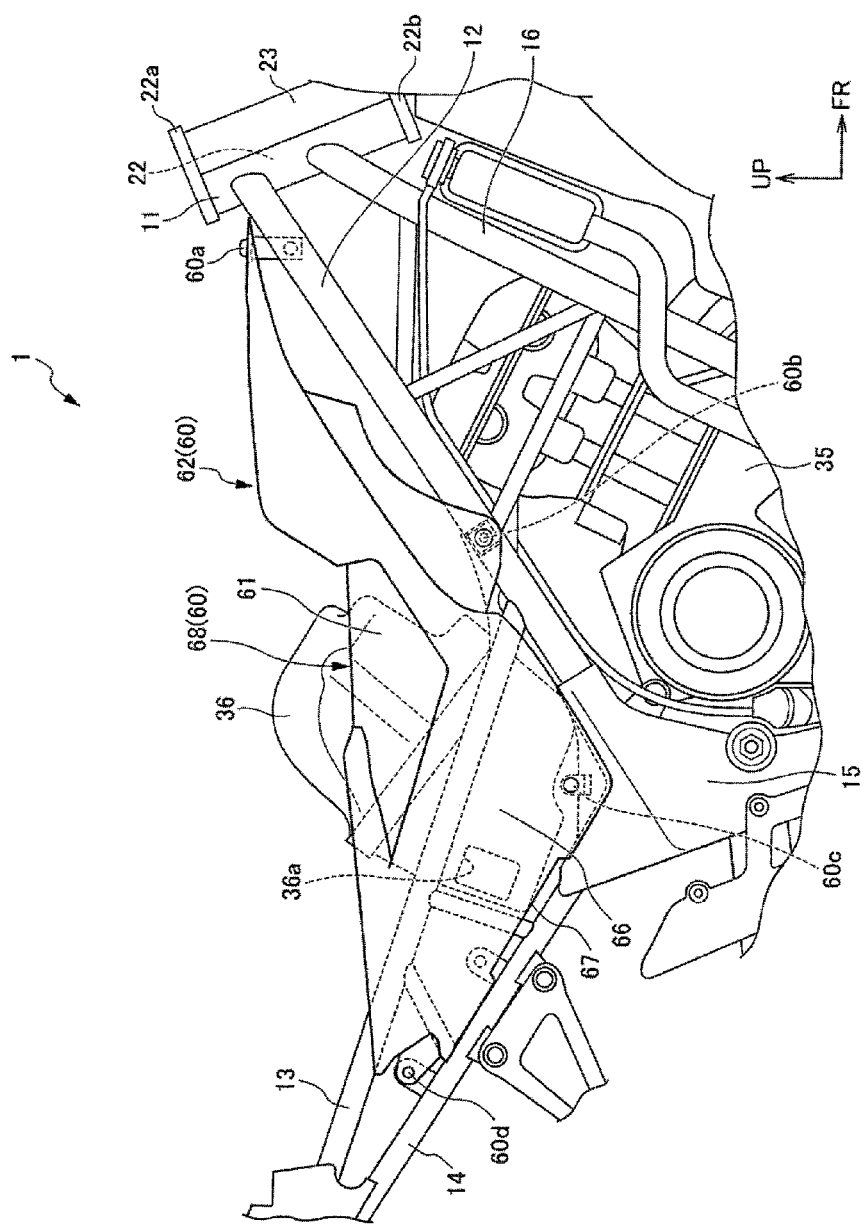
FIG. 2 is an enlarged right side view of the main parts showing the necessary configuration to explain the side cover structure of the motorcycle shown in FIG. 1.

The air cleaner 36 is fixed on the vehicle body frame 10, in the rear direction relative to the engine 35 and in the lower side of the rear direction of the fuel tank 41 as shown in FIG. 2.

The exhaust pipe 37 is connected on the lower portion of the engine 35 and extends in the rear direction. The rear end portion thereof is connected to the muffler 38.

The fuel tank 41 is fixed on the vehicle body frame 10, above the engine 35 and in the front direction of a passenger seat 42.

The passenger seat 42 is configured with a main seat 43 on which a rider is seated and a pillion seat 44 on which a rear pillion passenger is seated. The passenger seat 42 is fixed on the upper portion of the seat rail 13.

The vehicle body cover 50 has a front cowl 51, a middle cowl 52, an inner cowl 53, a lower cowl 54, a rear cowl 55, a pair of right and left side covers 60, a front fender 56, and a rear fender 57.

The front cowl 51 is disposed so as to cover the front direction of the vehicle body including the head pipe 11 in the upper direction side of the headlight 45. The front cowl 51 is attached to and supported on the middle cowl 52.

The middle cowl 52 is disposed in the side direction and lower direction side of the headlight 45 so as to cover the side direction of the front portion of the vehicle body including the engine 35 from the front direction of the vehicle body including the main frame 12 and the down tube 16. The middle cowl 52 is formed in an approximately triangle shape which spreads from the front direction to the rear direction in the side view. A part of the middle cowl 52 in the rear portion side is notched. The middle cowl 52 is attached to and supported on the vehicle body frame 10 with bolts and the like.

The inner cowls 53 are components integrally formed in an approximately V-shape in the side view and are disposed on both of right and left sides in the inner side of the rear portion of the middle cowls 52, so as to cover the side direction of the engine 35, respectively. The inner cowls 53 are attached to and supported on the middle cowl 52 at the front portion thereof, and are attached to and supported on the vehicle body frame 10 in the rear portion thereof.

The lower cowls 54 are disposed on both of right and left sides respectively, so as to cover the lower portion of the vehicle body including an exhaust pipe 37 extending from the engine 35. The lower cowl 54 is formed in an approximately triangle shape that spreads from the front direction to the rear direction in the side view. The lower cowl 54 is attached to and supported on the vehicle body frame 10 with bolts and the likes.

The rear cowl 55 is disposed so as to cover the rear portions of the seat rail 13 and the rear stay 14. The rear cowl 55 is formed in an approximately triangle shape which spreads from the rear portion side of the main seat 43 to the pillion seat 44 in the side view. The rear cowl 55 is attached to and supported on the seat rail 13 and the rear stay 14.

The front fender 56 is fixed on the front fork 23 and covers over the front wheel 21. The rear fender 57 is fixed on the seat rail 13 and covers over the rear wheel 31.

Next, with reference to FIGS. 1 and 2 to 6, the side cover structure of the motorcycle 1 will be explained.

As shown in FIG. 1, a side cover 60 extends from below the handle 24 to the lower side of the main seat 43 in the side view. The lower edge portion of the side cover 60 extends to be inclined downwardly along the upper end portion of the middle cowl 52 in the side view from the front direction to the rear direction, and extends to be inclined downwardly along the main frame 12 and is separated from the rear end portion of the middle cowl 52. Then, the lower edge portion of the side cover 60 changes direction to extend to be inclined upwardly along the v-shaped upper end portion of the pivot plate 15, extends to be inclined upwardly along the rear stay 14, and reaches to the front end portion of the rear cowl 55.

In the side view from the front direction to the rear direction, the upper edge portion of the side cover 60 is separated from the upper edge portion of the middle cowl 52 and extends along the approximately horizontal to the middle position of the fuel tank 41 in the front and rear direction, and then changes direction to extend obliquely downwardly at this position. Following that, the upper end portion of the side cover 60 extends approximately horizontally along the approximate bottom surface of the fuel tank 41, then extends along the side surface of the main seat 43, and reaches to the front end portion of the rear cowl 55.

Figure 3:
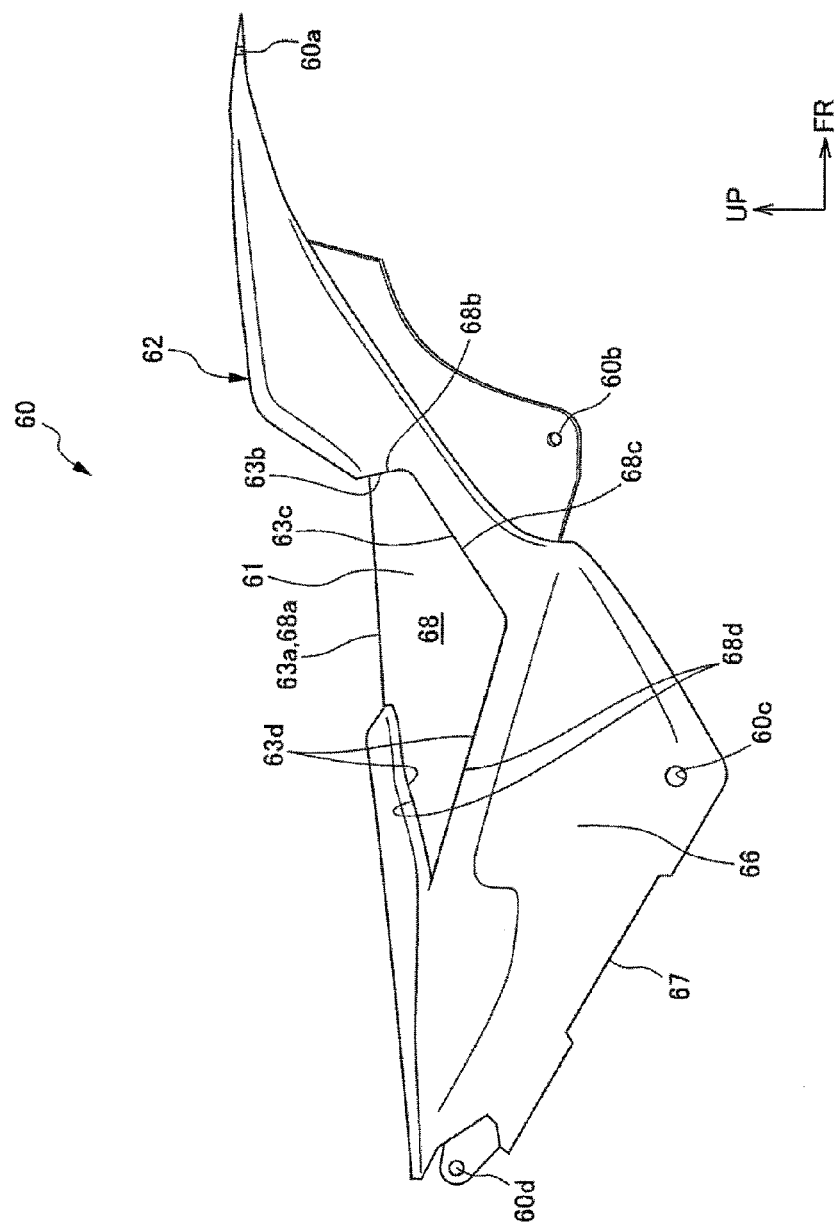
FIG. 3 is a front view of the right side cover of the motorcycle shown in FIG. 1.
Figure 4:
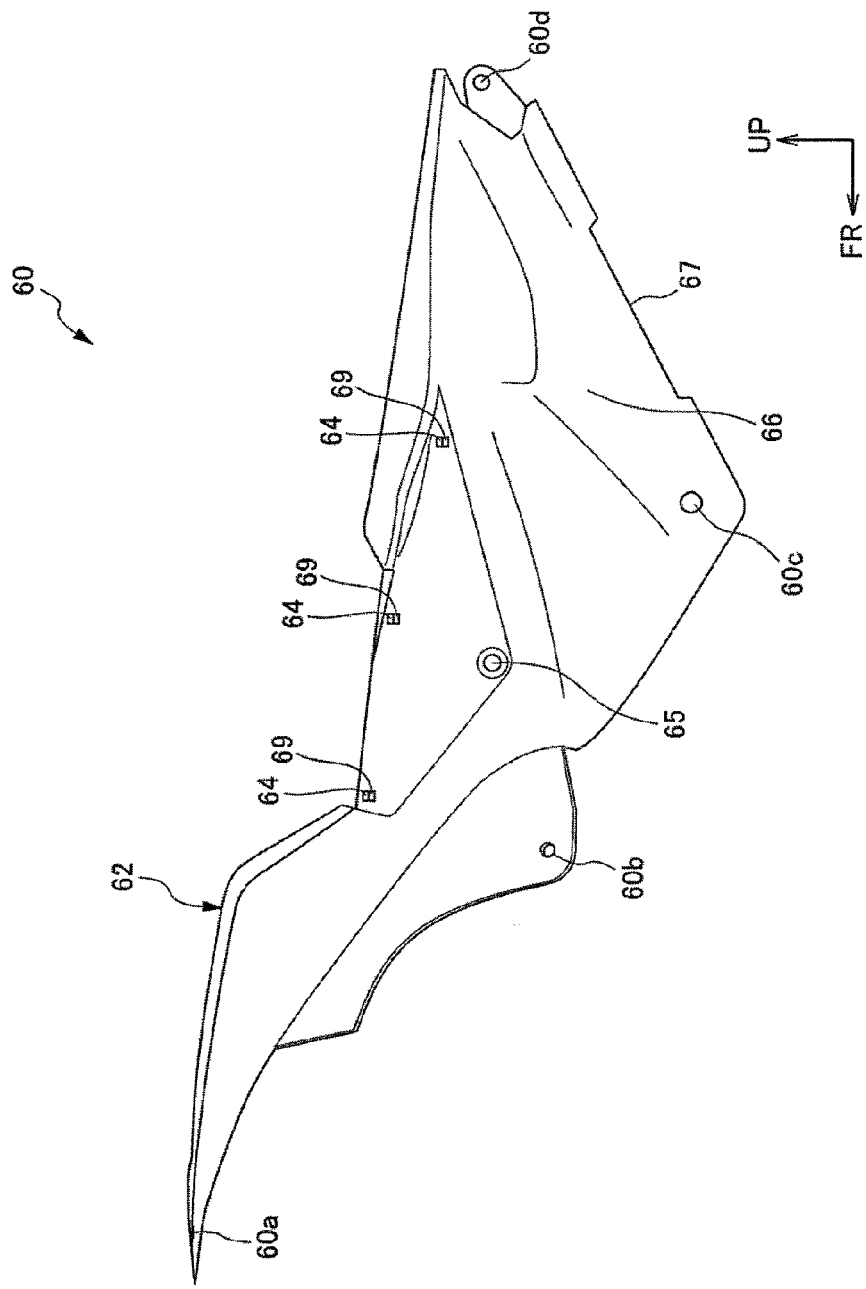
FIG. 4 is a back side view of the side cover shown in FIG. 3.

As shown in FIGS. 2 to 4, the side cover 60 has a first attachment portion 60a on the front end portion, a second attachment portion 60b on the downwardly inclined portion from the front direction to the rear direction thereof, a third attachment portion 60c on the changing portion of the inclination from downward to upward, and a fourth attachment portion 60d on the rear end portion.

As shown in FIG. 2, the first attachment portion 60a, the second attachment portion 60b and the third attachment portion 60c are attached to and supported on the main frame 12. The fourth attachment portion 60d is attached to and supported on the rear stay 14.

The side cover 60 has a knee grip portion 61 at the position where the passenger's legs touch in the front direction of the passenger seat 42 (specifically, the main seat 43). In FIG. 1, a knee grip portion 61 corresponds to the area where the upper end portion of the side cover 60 extends approximately horizontally along the approximate bottom surface of the fuel tank 41. The knee grip portion 61 is doubly configured inside and outside, as mentioned below.

The side cover 60 is configured with a main side cover 62, and a sub-side cover 68. The main side cover 62 has all of the above-mentioned shapes and the attached portions 60a to 60d of the side cover 60. Namely, the main side cover 62 corresponds to the outer shape of the side cover 60 in the side view. However, the sub-side cover 68 is disposed outside of the main side cover 62 at the knee grip portion 61.

As shown in FIG. 3, the sub-side cover 68 is materially in one piece of tabular member having the approximate pentagon shape in a side view. The sub-side cover 68 has an upper portion 68a extending approximately horizontally, a front portion 68b extending perpendicularly from the front end of the upper portion 68a to the lower direction, a lower portion 68c extending to be inclined downwardly from the lower end of the front portion 68b to the rear direction, and a rear portion 68d extending to be inclined upwardly from the rear end of the lower portion 68c to the rear direction and extending to be inclined upwardly from the middle thereof to the front direction.

The main side cover 62 has a concaved portion 63 fixing the sub-side cover 68. The depth of the concaved portion 63 of the main side cover 62 is formed so as to be approximately the same as at least the thickness of the sub-side cover 68. The shape of concaved portion 63 of the main side cover 62 is formed as approximately the same as the shape of the sub-side cover 68.

The concaved portion 63 of the main side cover 62 is configured with an upward opening 63a corresponding to the upper portion 68a of the sub-side cover 68, a front height difference 63b corresponding to the front portion 68b of the sub-side cover 68, a lower height difference 63c corresponding to the lower portion 68c of the sub-side cover 68, and a rear height difference 63d corresponding to the rear portion 68d of the sub-side cover 68.

As shown in FIG. 4, the sub-side cover 68 has a plurality of hooks 69 for attachment on the back surface side thereof. The hooks 69 for attachment are formed on a total of three points including the upper end portion in the front direction, the upper end portion in the rear direction, and the upper end portion in the middle of the sub-side cover 68.

The main side cover 62 has a plurality of groove holes 64 engaging the hooks 69 for attachment of the sub-side cover 68 at the positions corresponding to the hooks 69.

The hooks 69 for attachment of the sub-side cover 68 are engaged with the groove holes 64 of the main side cover 62. In addition to that, a tapping screw 65 is screwed into the middle in the thickness of the sub-side cover 68 from the back side of the main side cover 62. Accordingly, the sub-side cover 68 is fixed to the concaved portion 63 of the main side cover 62.

When the sub-side cover 68 is fixed to the concaved portion 63 of the main side cover 62, the sub-side cover 68 is surrounded with the front height difference 63b, the lower height difference 63c, and the rear height difference 63d of the main side cover 62, respectively, in the front portion 68b, the lower portion 68c, and the rear portion 68d thereof. The front portion 68b, the lower portion 68c and the rear portion 68d of the sub-side cover 68 are engaged with the front height difference 63b, the lower height difference 63c and the rear height difference 63d of the main side cover 62, respectively.

Figure 6:
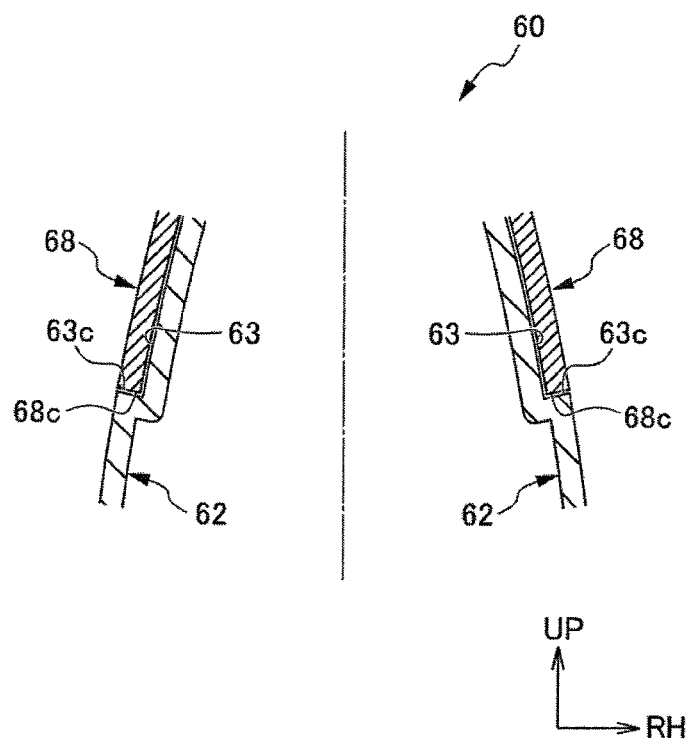
FIG. 6 is a schematically longitudinal sectional view of the right and left of side covers of the motorcycle shown in FIG. 1.

As shown in FIG. 6, the outer surface of the sub-side cover 68 and the outer surface of the main side cover 62 are configured in an approximately flush level.

The sub-side cover 68 is configured so as to spread from above to below in the side direction of the vehicle body. The knee grip portion 61 is disposed in the area of the sub-side cover 68.

The sub-side cover 68 is continuously provided with the fuel tank 41 below the fuel tank 41 in the side view.

The sub-side cover 68 is made of a painted ABS (Acrylonitrile Butadiene Styrene) resin. On the other hand, the main side cover 62 is made of a colored PP (polypropylene) resin.

Figure 5:
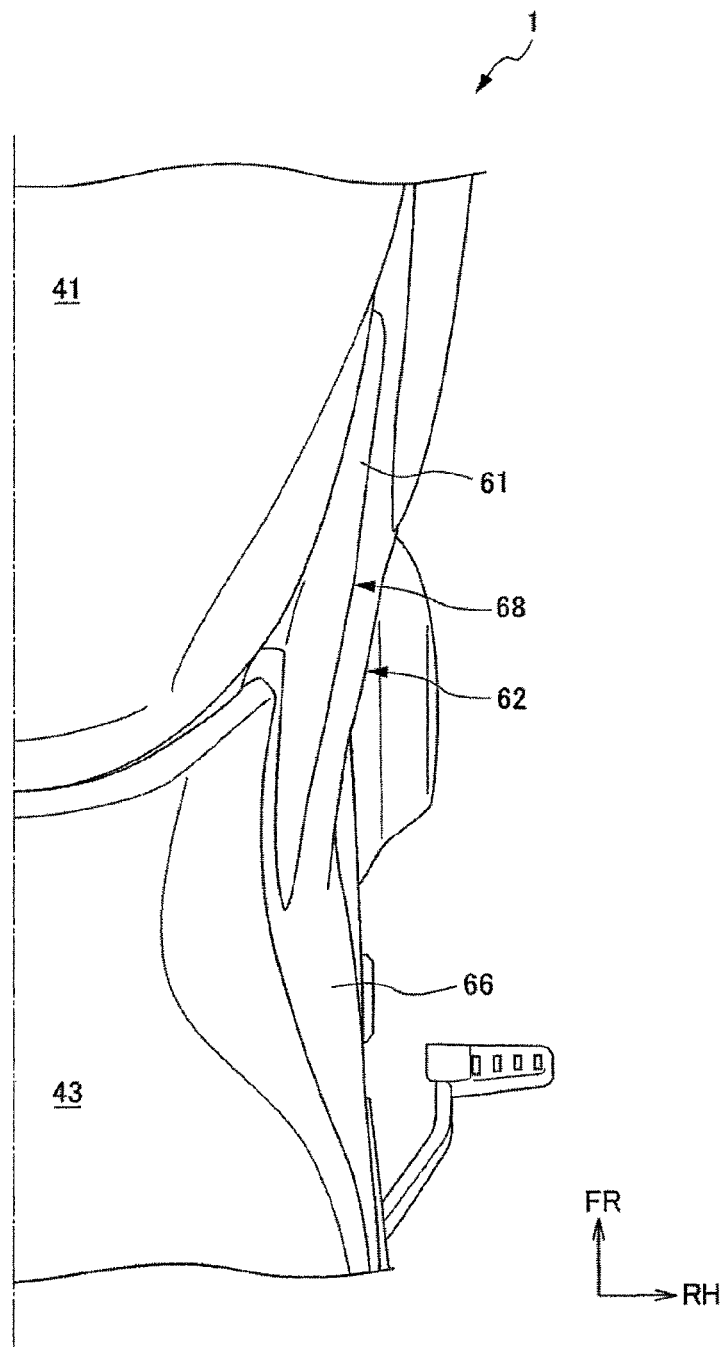
FIG. 5 is an enlarged plain view of the main parts of the motorcycle shown in FIG. 1.

As shown in FIG. 5, the main side cover 62 has a side swelling portion 66 spreading to the side direction of the vehicle body in the rear direction of the sub-side cover 68. The main side cover 62 has a notching portion 67 provided on the lower surface side which is adjacent to the side swelling portion 66.

The intake port 36a of the air cleaner 36 is disposed inside the side swelling portion 66 of the main side cover 62.

According to the present embodiment, there are some effects as mentioned below.

(1) The knee grip portion 61 of the side cover 60 is doubly configured inside and outside. Accordingly, this prevents damage caused by the heat of the engine 35 on passenger's legs touching on the knee grip portion 61.

(2) The sub-side cover 68 at the knee grip portion 61 is configured so as to spread from above to below in the side direction of the vehicle body. Accordingly, the sub-side cover 68 at the knee grip portion 61 can guide the passenger's legs to the outside. Simultaneously, this can prevent damage caused by the heat of the engine 35 on passenger's legs holding the vehicle body at the knees during operation.

(3) The main side cover 62 has the concaved portion 63 fixing the sub-side cover 68, despite the large size thereof. Accordingly, the main side cover 62 can increase in strength and prevent the deflection.

(4) The front portion 68b, the lower portion 68c and the rear portion 68d of the sub-side cover 68 are engaged with the front height difference 63b, the lower height difference 63c, and the rear height difference 63d of the main side cover 62, respectively. Accordingly, the sub-side cover 68 can be integrally engaged with the main side cover 62. As a result, this can prevent causing the vibration and abnormal noise of the sub-side cover 68.

(5) The outer surface of the sub-side cover 68 and the outer surface of the main side cover 62 are configured in an approximately flush level. Accordingly, the outer surface of the sub-side cover 68 and the outer surface of the main side cover 62 can be configured in a continuous surface. As a result, this can prevent the passenger's legs from touching unnaturally to the sub-side cover 68, which enables the passenger to grip the vehicle body at the knees, excellently.

(6) The fuel tank 41 and the sub-side cover 68 are continuously provided in a side view. Accordingly, this can prevent the passenger's legs from touching unnaturally to the sub-side cover 68, which enables the passenger to excellently grip the vehicle body at the knees.

(7) The main side cover 62 in a large size is made of an inexpensive PP resin. On the other hand, the sub-side cover 68 in a small size is made of a painted ABS resin. Accordingly, the entire cost of the side cover 60 can be controlled, and simultaneously the external appearance can be improved by the sub-side cover 68 in a small size.

If the sub-side cover 68 is continuously provided with the fuel tank 41 which is ordinarily painted, a sense of unity between the fuel tank 41 and the sub-side cover 68 can be emphasized, and the external appearance can be further improved.

(8) The notching portion 67 is provided on the lower surface side of the side swelling portion 66 inside which the intake port 36a of the air cleaner 36 is disposed. Accordingly, the air can excellently flow into from the intake port 36a through the notching portion 67, and the hot air filled inside the main side cover 62 can be discharged through the notching portion 67.

Moreover, in the above-mentioned embodiment, the depth of the concaved portion 63 of the main side cover 62 is formed so as to be approximately the same as the thickness of the sub-side cover 68. However, the present invention will not be limited to this. For example, the concaved portion 63 of the main side cover 62 is formed slightly deeper than the thickness of the sub-side cover 68, and the outer surface of the sub-side cover 68 and the outer surface of the main side cover 62 are configured in an approximately flush level. Accordingly, a space can be formed between the outer surface of the concaved portion 63 and the inner surface of the main side cover 62.

Thus, the space can function as an insulated space for insulating the main side cover 62 and the sub-side cover 68 from the heat in the area of the knee grip portion 61. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A side cover structure for a straddle vehicle comprising:
a vehicle body frame;
an engine supported on said vehicle body frame;
a passenger seat disposed above said engine; and
a side cover arranged to cover a portion of the vehicle body in a side direction of the vehicle;
the side cover structure including grip portions having upper end portions that extend along a bottom surface of the fuel tank in a forward direction of the passenger seat,
each of the grip portions having a portion configured in an inside direction and an another portion configured in an outside direction of the side direction of the vehicle, and further comprising:

the side cover has a main side cover covering the side direction of the vehicle body in the side view, and a sub-side cover covering the main side cover at each of the grip portions, and the main side cover including a concaved portion fixing the sub-side cover.

2. The side cover structure for the straddle vehicle according to claim 1, wherein said the side cover has the sub-side cover at least on each of the grip portions, and the sub-side cover is configured so as to spread from above to below in the side direction of the vehicle body.

3. The side cover structure for the straddle vehicle according to claim 2, and further including an air cleaner disposed on an intake passage of said engine;

said main side cover has a side swelling portion spreading to the side direction of the vehicle body in the rear direction of said sub-side cover, a notching portion is provided on the lower surface side adjacent to said side swelling portion; and an intake port of said air cleaner is disposed inside said side swelling portion of said main side cover.

4. The side cover structure for the straddle vehicle according to claim 1, wherein at least a front portion, a lower portion, and a rear portion of said sub-side cover are surrounded by a front height difference, a lower height difference, and a rear height difference, which configure said concaved portion of said main side cover, and engage each other, respectively.

5. The side cover structure for the straddle vehicle according to claim 4, and further including an air cleaner disposed on an intake passage of said engine;

said main side cover has a side swelling portion spreading to the side direction of the vehicle body in the rear direction of said sub-side cover, a notching portion is provided on the lower surface side adjacent to said side swelling portion; and an intake port of said air cleaner is disposed inside said side swelling portion of said main side cover.

6. The side cover structure for the straddle vehicle according to claim 4, wherein the depth of said concaved portion is formed so as to be approximately equal to at least the thickness of said sub-side cover, and the outer surface of said sub-side cover and the outer surface of said main side cover are configured so as to be at an approximately flush level.

7. The side cover structure for the straddle vehicle according to claim 4, wherein said sub-side cover is made of a painted ABS resin, and said main side cover is made of a colored PP resin.

8. The side cover structure for the straddle vehicle according to claim 1, wherein said sub-side cover is made of a painted ABS resin, and said main side cover is made of a colored PP resin.

9. The side cover structure for the straddle vehicle according to claim 1, and further including an air cleaner disposed on an intake passage of said engine;

said main side cover has a side swelling portion spreading to the side direction of the vehicle body in the rear direction of said sub-side cover, a notching portion is provided on the lower surface side adjacent to said side swelling portion; and an intake port of said air cleaner is disposed inside said side swelling portion of said main side cover.

10. A side cover structure adapted for use with a straddle vehicle comprising:

a side cover adapted for covering at least a portion of an engine as view from a side direction of the vehicle;

the side cover structure including grip portions having upper end portions that extend along a bottom surface of the fuel tank in a forward direction of a seat, each of the grip portions having a portion configured in an inside direction and an another portion configured in an outside direction of the side direction of the vehicle, and further comprising:

the side cover has a main side cover covering the side direction of the vehicle body in the side view, and a sub-side cover covering the main side cover at each of the right and left grip portions, and the main side cover including a concaved portion fixing the sub-side cover.

11. The side cover structure for the straddle vehicle according to claim 10, wherein said sub-side cover is made of a painted ABS resin, and said main side cover is made of a colored PP resin.

12. The side cover structure adapted for use with the straddle vehicle according to claim 10, wherein at least a front portion, a lower portion, and a rear portion of said sub-side cover are surrounded by a front height difference, a lower height difference, and a rear height difference, which configure said concaved portion of said main side cover, and engage each other, respectively.

13. A side cover structure for a straddle vehicle comprising:

a vehicle body;

an engine supported on the vehicle body frame;

a passenger seat disposed above the engine; and a side cover arranged to cover a portion of the vehicle body in a side direction of the vehicle;

the side cover structure including grip portions having upper end portions that extend along a bottom surface of the fuel tank in a forward direction of the passenger seat, each of the grip portions having a portion configured in an inside direction and an another portion configured in an outside direction of the side direction of the vehicle, and further comprising:

an air cleaner disposed on an intake passage of the engine;

a main side cover has a side swelling portion spreading to the side direction of the vehicle body in the rear direction of a sub-side cover, a notching portion is provided on the lower surface side adjacent to the side swelling portion; and an intake port of the air cleaner is disposed inside the side swelling portion of the main side cover.

* * * * *